March 12, 1957 E. RICHERT 2,784,922
PNEUMATIC CONVEYING SYSTEM TRANSMISSION TUBES
Filed April 5, 1956 3 Sheets-Sheet 1
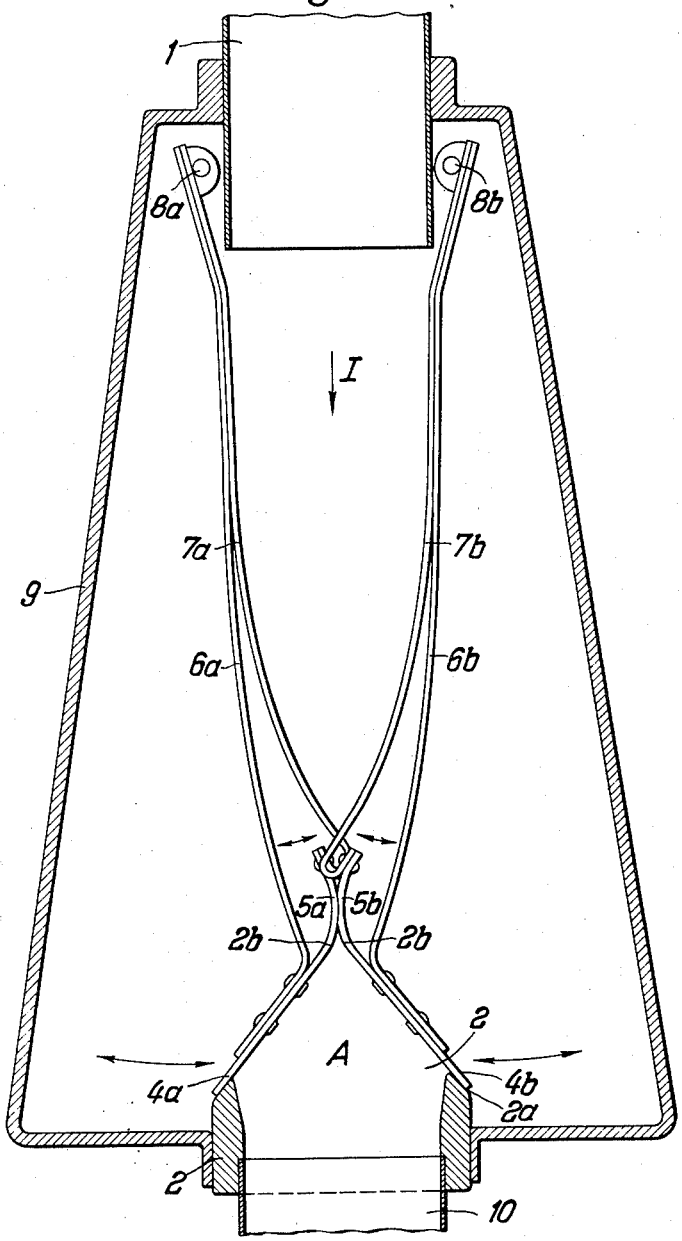
Inventor:
E. RICHERT
BY R.R.Morris
ATTORNEY March 12, 1957  E. RICHERT  2,784,922
PNEUMATIC CONVEYING SYSTEM TRANSMISSION TUBES
Filed April 5, 1956  3 Sheets-Sheet 2
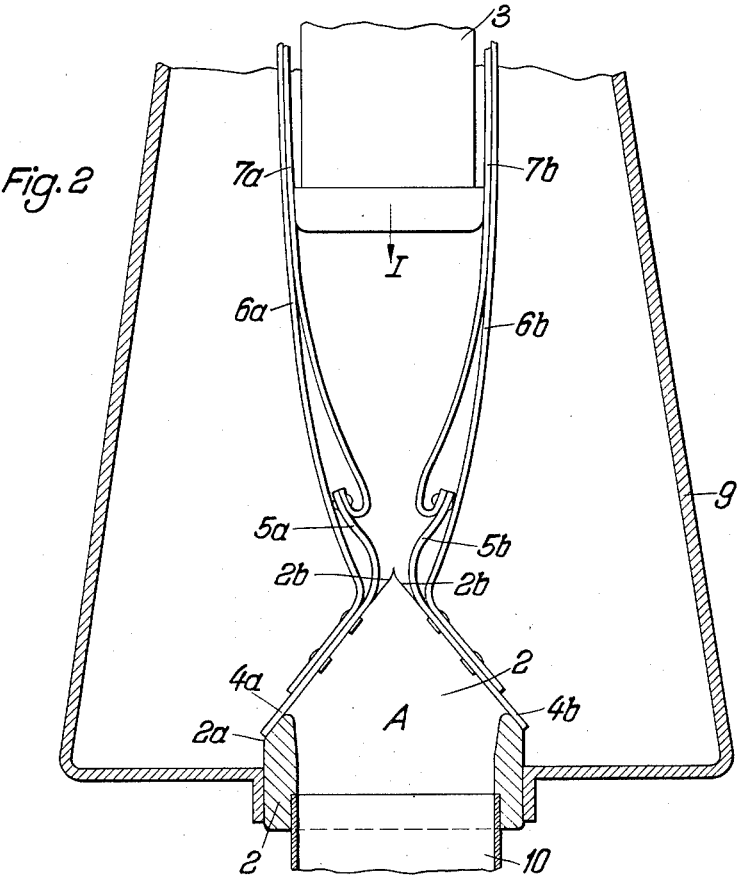
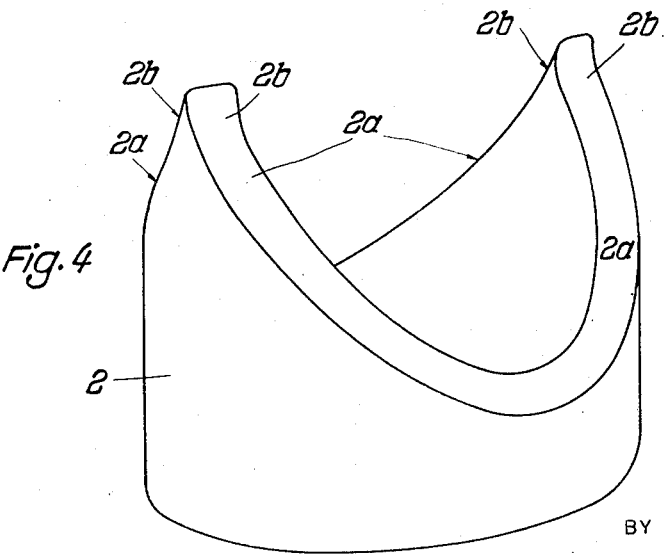
Inventor:
E. RICHERT
BY
ATTORNEY March 12, 1957  E. RICHERT  2,784,922
PNEUMATIC CONVEYING SYSTEM TRANSMISSION TUBES Filed April 5, 1956  3 Sheets-Sheet 3

Inventor:
E. RICHERT
BY R. P. Morris
ATTORNEY

United States Patent Office 2,784,922
Patented Mar. 12, 1957

2,784,922
PNEUMATIC CONVEYING SYSTEM TRANSMISSION TUBES

Eberhard Richert, Berlin-Steglitz, Germany, assignor to International Standard Electric Corporation, New York, N. Y., a corporation of Delaware Application April 5, 1956, Serial No. 576,497

Claims priority, application Germany April 12, 1955

6 Claims. (Cl. 243—38)

This invention relates to the transmission tubes employed in pneumatic conveying systems of the kind in which so-called carriers are used as containers for the articles to be conveyed. More particularly the invention concerns the valves arranged to compensate for differences in air pressure between two adjacent sections of a transmission tube.

If such pressure differences are great, the flap of such valves is pressed firmly against its seat so that the valves will be somewhat difficult to operate. Therefore, an auxiliary valve under control of the carriers has been arranged to reduce these pressure differences. In arrangements of this type the valve flap is connected to a lever actuated by the incoming carrier in order to open the valve when the carrier approaches it.

These arrangements suffer from certain draw-backs. In fact, they are very noisy in operation, and the wearing away of the levers, valves, and carriers is so great that considerable servicing is needed. In particular the abrasion of the carriers is such as to require them to be frequently changed. Moreover, the reliability of service much depends on the weight and type of the carriers. A heavy and well-sealing carrier will, of course, open the valve readily, but such a carrier, after having passed through the valve, also acts to produce behind it a suction so strong that the valve flap will be pressed against its seat with a force sufficient to hold the valve closed against the action of a second carrier lighter in weight and of lower speed than the former. The plant would thus cease from operating. However, should such second carrier nevertheless succeed in opening the valve, the valve may fail to reclose tightly enough, the suction produced by this carrier being insufficient. The insufficiency of the suction behind this carrier can also result in an insufficient braking action on the carrier, whereby trouble in the operation of the plant can be caused.

To avoid these shortcomings, the invention consists in certain features of novelty that will appear from the following description and be particularly pointed out in the appended claims, reference being had to the accompanying drawings. The main feature of the invention resides in that the flap valve between two tube sections of the transmission tube is so constructed as also to perform the office of the aforesaid auxiliary valve employed in prior arrangements.

In these drawings,

Fig. 1 is a fragmentary sectional view showing a longitudinal section through two tube sections having the valve according to the invention arranged between them, this valve being represented as at rest.

Figs. 2 and 3 are views similar to Fig. 1 and illustrate the action of an incoming carrier.

Fig. 4 is a perspective detail view showing the valve seat of the valve represented in Figs. 1, 2, 3.

Figure 3:
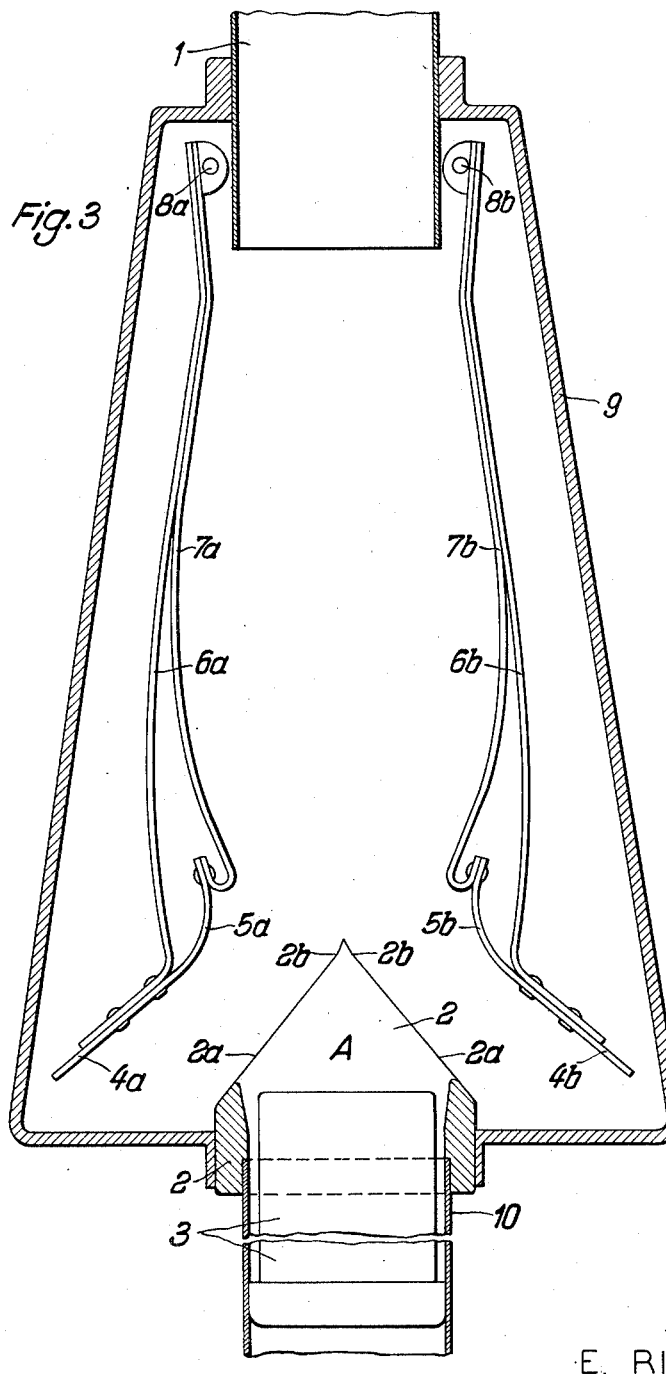

The transmission path shown in Figs. 1, 2, 3 is constituted by a tube 1, a chamber 9 to which this tube is incoming, the valve seat 2 of a flap valve A, and a tube 10 outgoing from chamber 9 and so fixed to the valve seat 2 as to be coaxial therewith and with tube 1.

The valve seat 2, as shown particularly in Fig. 4, has two sealing faces 2a situated, geometrically, in planes mutually inclined in the manner of saddle roofs. The faces 2a each terminate in two additional sealing faces 2b which are slightly curved inwards. The plane sealing faces 2a cooperate with two valve flaps 4a, 4b. These latter have resilient extensions forming additional or auxiliary flaps 5a, 5b for the sealing faces 2b, the flaps 5a, 5b being curved to bear, when at rest, tightly against the faces 2b and against each other, as shown in Fig. 1. The flaps 5a, 5b are riveted to steel-strap levers 7a, 7b, respectively. Riveted to the flaps 4a, 4b are steel-strap levers 6a, 6b, respectively. The levers 6a, 7a are fixed to a bearing 8a, and the levers 6b, 7b to a bearing 8b. The bearings are fixedly mounted in the walls of chamber 9.

When at rest, the parts 4a, 5a, 7a, 6a and 4b, 5b, 7b, 6b are in the positions illustrated in Fig. 1. A carrier 3 arriving in tube 1 as indicated by the arrow I, Fig. 2, comes against the resilient levers 7a, 7b to move these as well as the resilient flaps 5a, 5b apart, as shown in Fig. 2. The flaps 6a, 6b and the flaps 4a, 4b rigid with them can not yet be affected by the carrier because the flaps 4a, 4b are firmly retained on the valve seat 2 by the suction in tube 10. As soon as the resilient flaps 5a, 5b have been separated from each other as just described, air rushes from chamber 9 through the valve seat 2 into tube 10, whereby the pressure difference between the air in chamber 9 and that in tube 10 will be decreased. After the pressure equalization has thus been initiated, the carrier 3, pressing the levers 7a, 7b and flaps 5a, 5b against the spring levers 6a, 6b as illustrated in Fig. 2, will be able to easily push the parts 7a, 5a, 6a, 4a and 7b, 5b, 6b, 4b into the positions shown in Fig. 3, and will then enter the tube 10.

It can be seen that this action will be performed with safety by any carrier irrespective of its weight and speed, and with a noise much less than in prior arrangements. Also, the flaps 4a, 4b effecting a tight sealing, the carriers in tube 10 will be braked sufficiently by the suction they produce behind them.

When the carrier has passed by the levers and flaps, which in Fig. 3 are shown as moved out, they return, owing to the resiliency of the levers, to the positions represented in Fig. 1, so that the valve A will be closed by the flaps 4a, 4b and the additional flaps 5a, 5b becoming reapplied to the sealing faces 2a, 2b of the valve seat 2.

Thus, the valve A, in which the outgoing tube 10 terminates at the end facing the incoming tube 1, comprises a flap part 5a, 5b easy to open by the incoming carrier independently of the main part 4a, 4b in order to reduce the pressure difference that exists as long as part 5a, 5b is in its closed position. Owing to such reduction the carrier will be able, irrespective of its weight and speed, also to open this main part with ease and safety.

Though the valve here described by way of example has a two-part flap 4a, 4b as the main flap, and a two-part auxiliary flap 5a, 5b serving to reduce pressure differences, it will be possible to obtain good results with a valve whose flaps are of the single-part type. Other modifications may be made within the scope indicated by the appended claims, without departing from the spirit of the invention.

What is claimed is:

1. A transmission tube for pneumatic dispatch tube systems employing carriers, which comprises an incoming tube, an outgoing tube coaxial therewith, a flap valve at the end of said outgoing tube which faces said incoming tube, said valve comprising a main flap, an auxiliary flap, and a valve seat for said flaps forming a passage for the carriers, and means, under control of said carriers, to open said auxiliary flap prior to opening said main flap, and thereby to reduce the air-pressure difference between the said incoming and outgoing tubes which exists after the two said flaps have been closed.

2. A transmission tube according to claim 1, wherein said means serving to open said valve comprise spring levers forming a guide way for the carriers.

3. A transmission tube for pneumatic dispatch tube systems employing carriers, which comprises an incoming tube, an outgoing tube coaxial therewith, a flap valve at that end of said outgoing tube which faces said incoming tube, said valve comprising a valve seat forming a passage for the carriers and provided with two sealing faces situated in planes mutually inclined in the manner of saddle roofs, and also provided with two additional sealing faces which are continuations of the first said sealing faces, the transmission tube also comprising two main flaps for the first said sealing faces, two auxiliary flaps for the second said sealing faces, and means, under control of the carriers, to open said auxiliary flaps prior to opening said main flaps, and thereby to reduce the air-pressure difference between the said incoming and outgoing tubes which exists after the two said flaps have been closed.

4. A transmission tube according to claim 3, wherein the said additional sealing faces are curved inwards while said auxiliary flaps comprise resilient extensions of said main flaps and are so curved as to fit tightly into said curved sealing faces and also to bear tightly against each other.

5. A transmission tube according to claim 3, wherein said means serving to open said auxiliary flaps comprise spring levers fixed to the flaps and forming a guide way for the carriers.

6. A transmission tube according to claim 3, wherein said means serving to open said auxiliary flaps comprise spring levers fixed to said auxiliary flaps and forming a guide way for the carriers, and which also comprise additional spring levers fixed to said main flaps and extending along said first-mentioned spring levers and outside thereof.

References Cited in the file of this patent

UNITED STATES PATENTS

| | | |
|---|---|---|
| 933,527 | Brown | Sept. 7, 1909 |
| 1,926,565 | Taisey | Sept. 12, 1933 |